United States Patent [19]

Elmore et al.

[11] Patent Number: 4,972,036

[45] Date of Patent: Nov. 20, 1990

[54] THERMOSETTING ACRYLIC COPOLYMERS MODIFIED WITH CITRIC ESTERS

[75] Inventors: Jim D. Elmore; Elizabeth G. Zylla; William J. DeGooyer, all of Louisville, Ky.

[73] Assignee: Hi-Tek Polymers, Inc., Jeffersontown, Ky.

[21] Appl. No.: 399,572

[22] Filed: Aug. 28, 1989

[51] Int. Cl.$^5$ ............................................. C08F 2/00
[52] U.S. Cl. .................... 526/210; 526/212; 526/216; 526/310; 526/318.4; 526/318.42; 526/318.44; 526/318.45; 526/318.6; 526/320; 526/328; 526/328.5; 526/329; 526/329.7

[58] Field of Search .................. 526/210, 212, 216

[56] References Cited

U.S. PATENT DOCUMENTS 4,064,092 12/1977 Burroway et al. .................. 526/216
4,737,543 4/1988 Hendricks et al. .................. 526/216

*Primary Examiner*—Bernard Lipman
*Attorney, Agent, or Firm*—Herbert P. Price

[57] ABSTRACT

Modified acrylic copolymer compositions are made by polymerizing acrylic monomers in admixture with a citric ester. Such compositions are useful as pigment grinding vehicles and as vehicles for thermosetting coatings.

15 Claims, No Drawings

THERMOSETTING ACRYLIC COPOLYMERS MODIFIED WITH CITRIC ESTERS

BACKGROUND OF INVENTION

The field of art to which this invention pertains is thermosetting acrylic copolymers.

Thermosetting acrylic copolymer compositions have been used for a number of years in many industrial coating systems, particularly, in automotive and industrial coatings. Such compositions, basically, are copolymers of hydroxyalkyl acrylates or methacrylates, copolymerizable acids, and acrylic esters, methacrylic esters and/or alkenyl aromatic hydrocarbons These copolymers are then formulated with crosslinking agents, e.g., aminoplast resins, polyisocyanates, and epoxy resins, into automotive and industrial coatings. Thermosetting acrylic compositions have been described in such patents as U.S. Pat. Nos. 3,375,227, 3,438,800, 3,446,769, 3,639,147 and 4,591,533.

Many attempts have been made over the years to improve the application properties of paints made from thermosetting acrylic copolymers and the resistance properties of the paint. Other attempts have been made to raise the solids content of the formulated paint, thereby reducing the amount of environmentally undesirable solvents which must be disposed of when the paints are applied.

U.S. Pat. No. 4,609,717 discloses high solids coating compositions made from acrylic copolymer crosslinking agents and reactive diluents made from long chain aliphatic diols reacted with lactones, epoxides, or mixtures thereof.

In U.S. Pat. No. 4,681,815, coating compositions made from acrylic resins and polyester oligomers are described.

Low temperature curable coating compositions made from a solution of an alkoxymethylmelamine and a styrene-allyl alcohol copolymer added to an acrylic resin are described in U.S. Pat. No. 4,554,319.

Esters of citric acid having uses as plasticizers, stabilizers and lubricants are described in such patents as U.S. Pat. Nos. 2,122,716, 3,239,555, 3,241,992, 3,251,792 and 4,287,741 as well as German DE No. 2,306,744 and British No. 1,450,273.

SUMMARY OF INVENTION

This invention is directed to thermosetting acrylic copolymer compositions In one aspect, this invention pertains to thermosetting acrylic copolymers modified with citric esters. In another aspect, this invention relates to a process for preparing thermosetting acrylic copolymers modified with citric esters.

The composition of this invention is comprised of:
(a) an acrylic copolymer and,
(b) a citric ester wherein at least a portion of the citric ester is grafted with the acrylic copolymer The citric ester has the formula:

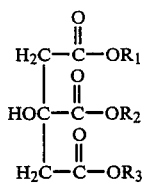

-continued
wherein $R_1$ and $R_2$ are selected from

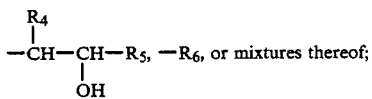

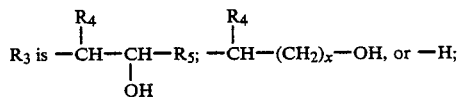

$R_4$ and $R_5$ are H, or an alkyl, cycloalkyl, or an alkyl ester group containing 1 to about 32 carbon atoms wherein the total number of carbon atoms in R and $R_5$ are 0 to about 32; wherein $R_6$ is an alkyl group containing 1 to about 18 carbon atoms, or a cycloalkyl group containing 5 to about 10 carbon atoms and wherein x may be 3 to 18. Each of these R groups is so selected that the total number of OH groups in $R_1$, $R_2$ and $R_3$ are 1.5 to 3, and the total number of carbon atoms varies from 6 to 40.

The compositions of this invention are useful as pigment grinding aids and in the formulation of thermosetting coating compositions.

DESCRIPTION OF THE INVENTION

The copolymers useful in this invention are the well known film forming copolymers which are generally referred to in the trade as thermosetting acrylic copolymers. Such copolymers are described in a number of patents, among which are U.S. Pat. Nos. 3,375,227, 3,438,800 and 4,591,533, which patents are hereby incorporated by reference. Thermosetting acrylic copolymers contain functional groups which are reactive with crosslinking agents, such as aminoplast resins and polyisocyanates. Such functional groups are hydroxyl groups, carboxylic acid groups and amine groups.

The acrylic copolymers are polymerized from such monomers as alkyl acrylates, alkyl methacrylates, hydroxyalkyl acrylates, hydroxyalkyl methacrylates, acrylic acid, methacrylic acid and the like, wherein the alkyl groups contain about 1 to about 18 carbon atoms, preferably about 1 to about 8 carbon atoms Additional monomers which are used in combination with the acrylic monomers are the vinyl aromatic monomers, particularly styrene.

Typical monomers which are used to make the acrylic copolymers useful in this invention are ethyl acrylate, butyl acrylate, 2-ethyl hexylacrylate, lauryl acrylate, methyl methacrylate, ethyl methacrylate, butyl methacrylate, lauryl methacrylate, hydroxyethyl acrylate, hydroxypropyl acrylate, hydroxyethyl methacrylate, hydroxypropyl methacrylate, and the like. Acids, in addition to acrylic an methacrylic acid can include itaconic acid and half esters of maleic and fumaric acid.

Other acid monomers include those made by reacting hydroxyl functional monomers, e.g., hydroxyethyl acrylate, with anhydrides, such as chlorendic anhydride, hexahydrophthalic anhydride, phthalic anhydride, and the like. Similar acids can be incorporated into the copolymer by post-reacting hydroxyl functional copolymers with anhydrides.

Additional monomers are those which contain a pendant amino group, preferably a tertiary amino group, and are esters of acrylic or methacrylic acid, or substituted acrylamide or methacrylamides. Examples of such monomers are dimethylaminoethyl acrylate, dimethylaminoethyl methacrylate, dimethylaminopropyl methacrylate, dimethylaminopropyl acrylamide, dimethylaminopropyl methacrylamide, 3-dimethylaminoneopentyl acrylate and the like. These amino acrylic monomers are particularly useful as comonomers in water soluble acrylic polymers.

Preferably, the acrylic polymers useful in this invention are made from acrylic ester monomers, aromatic monomers, hydroxyfunctional monomers, acid functional monomers and amine functional monomers wherein the polymer has a hydroxyl number of about 30 to about 190 and an acid number of about 1 to about 100.

The preferred acrylic esters are butyl acrylate, butyl methacrylate and methyl methacrylate. The preferred aromatic monomer is styrene. The preferred functional monomers are hydroxyethylacrylate, hydroxyethyl methacrylate, hydroxypropyl acrylate, and hydroxypropyl methacrylate. The preferred acid monomers are acrylic acid and methacrylic acid. The preferred amine monomers are dimethylaminoethyl acrylate, dimethylaminopropyl methacrylate and dimethylaminoethyl methacrylate.

The citric esters useful in this invention are described in copending application, Ser. No. 248,732, filed Sept. 26, 1988 which is hereby incorporated by reference.

The citric esters useful in this invention are made by esterifying the acid groups of the acid with hydroxyl functional compounds leaving the tertiary hydroxyl group unreacted.

One class of hydroxyl functional compounds are glycols which contain from 2 to 12 carbon atoms and have at least 1 primary hydroxy group, e.g., ethylene glycol, 1,2-propylene glycol, 1,3-butylene glycol, 1,4-butylene glycol, 1,6-hexanediol, 1,2-dodecanediol, and the like.

Another class of hydroxyl functional compounds are vicinal epoxides which contain only one epoxide group per molecule and no other groups which are reactive with the carboxylic acid groups of the citric acid under the reaction conditions used herein. The vicinal monoepoxides contain about 2 to about 32 carbon atoms per molecule. The preferred monoepoxides are free of ether groups. These vicinal epoxides are derived from linear, branched, and cyclo olefins, alkyl esters of unsaturated fatty acids, glycidyl esters of monocarboxylic acids, copolymers of isobutylene and butene or propylene and the like.

Particularly useful mono vicinal epoxides are those derived from alpha olefins which contain from 2 to about 18 carbon atoms. Examples of these alpha olefin epoxides are ethylene oxide, 1,2-propylene oxide, 1,2-butylene oxide, 1,2-octylene oxide, 1,2-decylene oxide, 1,2-dodecylene oxide and the like.

Additional useful mono vicinal epoxides are those derived from non-alpha olefins, branched chain olefins and cyclo olefins. Examples of these compounds are 2,3-butylene oxide, 3,4-hexylene oxide, epoxidized cyclohexene, limonene oxide, and the like.

Other useful mono vicinal epoxides are epoxidized esters of unsaturated acids wherein the acids contain about 18 to about 22 carbon atoms and the ester group is an alkyl group containing 1 to about 8 carbon atoms Examples of epoxidized esters are methyl epoxy soyate, ethyl epoxy soyate, propyl epoxy linseedate, hexyl epoxy linseedate, and the like.

Epoxidized esters which can be used in this invention are glycidyl esters, particularly, the glycidyl ester of Versatic Acid. Versatic Acid is the trade name of synthetic tertiary monocarboxylic acids having chain lengths of 9 to 19 carbon atoms. Other monoepoxide esters are those derived from dicyclopentadiene diepoxide wherein one epoxide group has been esterified with a monocarboxylic acid.

One more type of useful monoepoxide is the monoepoxide of the copolymer of isobutylene and butene which has an average molecular weight of about 300 to about 400.

Still another class of hydroxyl functional compounds are monohydric primary and secondary alcohols which contain from 1 to 18 carbon atoms, examples of which are methanol, isopropanol, n-butanol, 2-ethylhexanol, decanol, benzyl alcohol and the like. Additional useful alcohols are the cycloalkanols which contain 5 to 10 carbon atoms, such as cyclopentanol, cyclohexanol, methyl cyclohexanol and the like.

In preparing the esters used in this invention wherein the ester constituents contain three hydroxyl groups, the citric acid can be esterified to completion using a stoichiometric excess of glycol and removing the excess glycol by distillation when the esterification is complete However, a preferred process for conducting the esterification is to partially esterify the acid groups with the glycol and then to complete the esterification with a mono vicinal epoxide. The partial esterification can be conducted to an acid value of about 75 to about 150 with the glycol followed by reaction with the monoepoxide to the desired acid value, i.e., below about 30.

The esterification can also be conducted entirely with the monoepoxide. However, when all epoxide is used rather than glycol, the epoxide has a tendency to chain extend, i.e., react with itself thus forming alkylene ether groups. Ether groups in the citric ester reduce the ultraviolet light resistance of coatings in which the citric ester has been incorporated.

The use of all glycol in the process produces some diester—both hydroxyl groups of the glycol react—which results in a higher viscosity product. When partial esterification with glycol followed by complete esterification with monoepoxide is used, low viscosity compositions with a minimum of ether formation are produced.

When the esters used in this invention contain less than three hydroxy groups in the ester constituents, i.e., when the composition is a mixed ester, the esterification can be conducted stepwise wherein each constituent is reacted separately. However, it is preferred to conduct the esterification reaction in two stages. In the first stage, the esterification is conducted with the glycol or monohydric alcohol, or mixture of the two. In the second stage, the esterification is conducted with the monoepoxide to an acid value below 30 and, preferably below 10.

The esterification reaction can be conducted in a water immiscible solvent wherein azeotropic distillation can be used to remove the water of esterification. The reaction can also be conducted using no solvent. Useful solvents are hydrocarbon solvents having a boiling point of about 75° C. to about 140° C., examples of which are benzene, toluene, and xylene. A particularly preferred solvent is cyclohexane.

The esterification reaction between the acid and hydroxyl groups can be catalyzed by well known esterification catalysts, such as para-toluene sulfonic acid, methane sulfonic acid, sulfuric acid, titanate esters, titanium chelates, metal alcoholates and carboxylates, and the like. A particularly preferred catalyst is triphenylphosphite. These esterification catalysts are used in the amount of about 0.1 to about 5 weight percent, preferably about 0.5 to about 2 weight percent, said weight percents being based on the weight of the reactants.

The esterification reaction between the acid and epoxide groups can be catalyzed by the well known carboxylic acid-epoxy catalysts, such as potassium hydroxide, sodium ethoxide, tertiary amines, quaternary ammonium bases and salts, quaternary phosphonium bases and salts, and metal chelates, such as magnesium acetylacetonate, aluminum acetylacetonate, and zirconium acetylacetonate. A preferred catalyst is made from equal parts of a quaternary salt, e.g., benzyltriphenyl phosphonium chloride, and a metal chelate, e.g., aluminum acetylacetonate. These catalysts are used in the amounts of about 0.05 to about 1 weight percent, preferably about 0.1 to about 0.5 weight percent, said weight percent being based on the weights of the reactants.

As stated hereinabove, the ester compositions useful in this invention contain about 1.5 to about 3 hydroxyl groups in addition to the tertiary hydroxyl group on the citric acid moiety. The total number of carbon atoms in the alcohol constituents of the ester vary from about 6 to about 40. If less than 6 carbon atoms are present, the ester is too hydrophilic and/or too volatile. If more than 40 carbon atoms are present, the ester is somewhat hard to handle and is a poor diluent Preferred ester compositions have the following components in the listed ranges:

butyl—about 0.5 to about 1.5 equivalents
cyclohexyl—0 to about 1 equivalents
2-hydroxypropyl—about 0 to about 1.5 equivalents
hydroxyethyl—0 to about 0.5 equivalents
hydroxy—$C_8$–$C_{14}$—about 0.1 to about 1 equivalent.

The total number of equivalents of the components is about 3.

A particularly preferred composition is prepared from 1 mole of citric acid, 0.5 mole of an butanol, 0.5 mole of cyclohexanol, 1.0 mole of ethylene glycol and 1.0 mole of 1,2-epoxy octane In preparing the compositions of this invention, the acrylic monomers are polymerized in admixture with the citric esters using as polymerization and grafting catalysts, compounds which undergo thermal decomposition to generate free radicals. Examples of such compounds are dialkyl peroxide, peroxyesters, hydroperoxides and diazo compounds. The preferred catalysts for use in this invention have a one hour half life at temperatures from about 80° C. to about 200° C.

Specific examples of useful catalysts are: tertiary butyl perbenzoate; cumyl hydroperoxide; dicumyl peroxide; benzoyl peroxide; 2,2′-azobis(methylbutyronitrile); and 1,1-azobis(cyanocyclohexane).

The amount of catalyst used in the polymerization and grafting reaction will vary from about 2 to about 8 weight percent based on the weight of monomers.

In preparing the compositions of this invention, a monomer catalyst solution is slowly added to a solution of the citric acid ester in a suitable solvent while maintaining the temperature of the reaction at about 130° to about 190° C. After the addition of the monomer—catalyst solution is completed, a time of about 1 to about 2 hours, heating is continued with or without additional catalyst to complete the polymerization reaction.

In the compositions of this invention, the acrylic polymer is present in the amount of about 15 to about 95 weight percent and the citric ester is present in the amount of about 5 to about 85 weight percent, said weight percents being based on the acrylic polymer and the citric ester.

The compositions of this invention are useful as the film forming vehicle in the thermosetting coating compositions. Such compositions exhibit superior compatibility with other coating components than the unmodified acrylic copolymers. Somewhat higher solids coatings can also be obtained using the compositions of this invention. When used as the film forming vehicle, the amount of citric ester is preferably present in the grafted composition in the amount of about 5 to about 30 weight percent.

The compositions of this invention are particularly useful as grinding aids for pigments Grinding time required to obtain Hegman Grind values of 8 can be reduced considerably by using the modified acrylic composition as the grinding vehicle In the manufacture of paints, particularly industrial paints, e.g., automotive paints, the pigments used in the paints are not added to the paint formulation directly, but are preground in a portion of the vehicle. The resulting pigment paste is then formulated into the paint composition. When used as a pigment paste vehicle, the amount of citric ester is preferably present in the grafted composition in the amount of about 15 to about 50 weight percent.

In the manufacture of thermosetting acrylic automotive paints which are made from an hydroxy functional acrylic resin and an aminoplast resin, pigment pastes used in the manufacture are generally made by grinding the pigment in a portion of the aminoplast resin. In order to obtain a proper grind (Hegman Grind value of 8) with a pigment such as carbon black, grind times of 24 hours or more are required when the grind is conducted in an aminoplast resin. Use of the compositions of this invention as the grind vehicle reduces the grind time to 14 hours or less.

When formulated into thermosetting paints, the modified acrylic compositions of this invention are blended with aminoplast resins derived from such amino compounds as urea, N,N′-ethylene urea, dicyandiamide and aminotriazines reacted with an aldehyde and an alcohol. Examples of triazines are melamine, acetoguanamine, benzoguanamine and the like. The preferred amino compound is melamine Various aldehydes can be used such as acetaldehyde, acrolein, propionaldehyde and the like. The preferred aldehyde is formaldehyde which includes trioxane and paraformaldehyde.

Suitable alcohols are the 1 to 8 carbon monoalcohols, such as methanol, ethanol, isopropanol, n-butanol, isobutanol, hexanol and 2-ethylhexanol. The preferred alcohols are methanol and n-butanol.

The aminoplast resins can be monomeric or polymeric, the monomeric or polymeric nature being dependent on the reaction ratio of the amino compound and the aldehyde as is well known to those skilled in the art. Commercially available aminoplast resins are sold, for example, under the trademarks Cymel and Syn-U-Tex by American Cyanamid Company and Hi-Tek Polymers, Inc. respectively.

Aminoplasts or amino resins are described in detail in "Encyclopedia of Polymer Science and Technology." Volume 2, pages 1-94, which is hereby incorporated by reference.

The pigment grinding is conducted in mills, such as steel ball mills, pebble mills, 2 and 3 roll mills and sand grinders High speed dispersers can also be used. The preferred grinding apparatuses are ball and pebble mills.

Any of the well known pigments which are used in paint manufacture can be ground into pigment pastes using the compositions of this invention as the grinding vehicle. Examples of such pigments are carbon black, titanium dioxide, red iron oxide, aluminum metal, metal silicates, lithophone, cadmium reds, cuprous oxide, umbers, ochers, phthalocyanines, quinacridones, hansa yellows, benzidine yellows, and the like. Other examples of useful pigments are disclosed in Kirk-Othmer "Encyclopedia of Chemical Technology", Second Edition, Vol. 15, pages 495–605, which is hereby incorporated by reference. The compositions of this invention are particularly useful as grinding vehicles for hard to grind pigments, e.g., carbon black.

In preparing carbon black pigment grinds, the amount of pigment used with the vehicle can vary from about 0.1 to about 0.7 part by weight to 1 part by weight of the vehicle. The preferred amount of pigment is about 0.5 to about 0.7 to 1 part of vehicle.

For other pigments, e.g., titanium dioxide, satisfactory pigment grinds can be obtained in steel or porcelain media mills using loadings of greater than 4 parts of pigment to 1 part of resin.

This invention is described in more detail by the following examples. Parts and percentages unless otherwise designated are parts and percentages by weight.

EXAMPLE 1

To a suitable reactor equipped with an azeotrope trap to collect water were added 1728.9 parts of citric acid, 999.0 parts of n-butanol, 556.8 parts of ethylene glycol, 24.6 parts of triphenylphosphite, and 160 parts of cyclohexane. Heat was applied raising the temperature to 89° C. where refluxing began and distilled water began to separate in the trap. The temperature was held at 89°–90° C. for 5 hours and 40 minutes while azeotroping water and cyclohexane with removal of water and the return of cyclohexane to the reactor. Additional cyclohexane, 105 parts, was added to control the temperature at about 90° C. Heating at 90° C. was continued for about 7 hours while azeotroping solvent and water. Additional catalysts, 8.2 parts triphenylphosphite, and 140 parts cyclohexane were added. Heating at about 90° C. was continued for about 8 hours. After adding 3.5 parts of triphenylphosphite, heating was continued for 4 hours and 40 minutes. About 407 parts water were removed during the heating periods. The solvents were removed by distilling to a pot temperature of 115° C. and holding at this temperature for one hour. The resulting partial citric ester had an acid value of 100.8, nonvolatile content of 98.2 percent, a Gardner color of less than 1 and a Gardner-Holdt viscosity at 25° C. of $Z_4$–$Z_5$.

To another reactor were added 841.5 parts of the partial ester, 0.55 part of aluminum acetylacetonate and 0.55 part of benzyltriphenylphosphonium chloride. Heat was applied raising the temperature to 65° C. 1,2-epoxy decane, 263.7 parts, was then added slowly over a period of 4 hours while holding the temperature at 57°–64° C. At the end of the addition period, the temperature was raised to 79° C. and was held at 78°–80° C. for about 6 hours. The reaction product had a nonvolatiles content of 96.6 percent, a Gardner-Holdt viscosity at 25° C. of Y-Z, an acid value of 34.4, and an epoxide equivalent weight of 33,325. The product was clear with a Gardner color of less than 1.

To another reactor were added 203 parts of ethyl-3-ethoxypropionate and 200 parts of the citric ester described hereinabove. Heat was applied raising the temperature to 166° C. Addition of a monomer and catalyst solution of 120 parts styrene, 180 parts butyl methacrylate, 126 parts of butyl acrylate, 174 parts of hydroxypropylmethacrylate, and 24 parts of dicumyl peroxide was begun. Addition was completed in 1 hour and 7 minutes with the temperature being held at 162°–166° C. during the addition. Heating was continued for 1 hour and 44 minutes with the temperature rising to 171° C. Vacuum was then applied to remove the solvent. Butyl acetate, 203 parts, was then added to replace the solvent. The resulting copolymer graft solution had a nonvolatile content of 79.6 percent, a Gardner-Holdt viscosity at $Z$–$Z_1$, a weight per gallon of 8.76 pounds, a Gardner color of less than 1 and an acid value of 10.

EXAMPLE 2

To a porcelain pebble mill were added 200.5 parts of the copolymer-graft solution of Example 1, 315 parts of titanium dioxide, 39.3 parts of n-butanol and 33.3 parts of methylisobutyl ketone. After grinding for 6 hours, the Hegman Grind value was 8 (ASTM-D1210-79).

A white paint was prepared by mixing together 128.9 parts of the white pigment grind described above, 36.6 parts of the copolymer graft solution of Example 1, 1.6 parts of catalyst (amine neutralized para-toluene sulfonic acid at 25 percent solids in isopropanol), 18.7 parts of methoxymethylmelamine and 16.2 parts of methylisobutyl ketone. The resulting paint had a solids content of 68.15 percent (VOC Method), and a viscosity of 20 seconds, No. 4 Ford Cup.

Films were prepared from the paint on Bonderite 1000 steel panels at dry film thickness of 1 mil. After baking for 15 minutes at 300° F., the films were well cured, passing 200 double rubs with methylethyl ketone. The films had a pencil hardness of H, a 20° gloss of 56 and a 60° gloss of 86.

EXAMPLE 3

To a steel ball mill were added 314.07 parts of the copolymer-graft solution of Example 1, 150 parts of carbon black, 100 parts of butanol and 361 parts of butyl acetate. After 8 hours grinding time, the Hegman Grind value was 8. n-Butanol, 100 parts, was added to the mill, and after thorough mixing, the pigment grind was removed from the mill. The mill was rinsed with 200 parts of n-butanol which was combined with the grind The grind was then filtered through an 80 mesh bag.

A black paint was prepared by premixing 40.2 parts of the copolymer-graft of Example 1, 5 parts of butyl acetate, 1.2 parts of flow control agent and 21.42 parts of butylated melamine formaldehyde resin at 84 percent nonvolatile and adding the premix to 50 parts of the black pigment grind described above plus 5 parts of n-butanol. The resulting black paint was drawn down on Bonderite 1000 steel panels at 3 mil wet film thickness and was baked for 15 minutes at 250° F. The film properties of the paint (Example 3A) are listed in Table 1.

To a portion of the paint was added 0.25 percent of the paratoluene sulfonic acid catalyst described in Example 2. (Ex 3A1). To another portion was added 0.5 percent of the same catalyst (Ex 3A2). To another portion of the paint were added 0.22 percent (Ex 3A3) flow control agent and 0.12 percent fluorocarbon acid.

Another paint was prepared from 46.48 parts of the copolymer-graft product of Example 1, 5 parts of butyl acetate, 1.2 parts of flow control agent, and 21.42 parts of butylated melamine formaldehyde resin at 84 percent N.V mixed with 25 parts of the black pigment grind and 5 parts of n-butanol. (Ex 3B). To a portion of the paint was added 0.25 percent paratoluene sulfonic acid catalyst of Example 2 (Ex 3B1). To another portion was added 0.5 percent of the catalyst (Ex 3B2). To still another portion were added 0.22 percent flow control agent and 0.12 percent fluorocarbon acid (Ex 3B3).

Films were prepared from all of the paints on Bonderite 1000 steel panels at 3 mil wet film thickness. The films were baked for 15 or 30 minutes at 250° F. Films properties are shown in Table 1.

TABLE 1

| Example | Bake Temp. °F. | Time Min | Pencil Hardness | 60° Gloss | Direct Impact Ft/lbs |
|---|---|---|---|---|---|
| 3A | 250 | 15 | 3B | 86 | 60 |
| 3A1 | 250 | 30 | HB-F | 83 | 75 |
| 3A2 | 250 | 15 | F | 83 | 78 |
| 3A3 | 250 | 30 | F-H | 85 | 56 |
| 3B | 250 | 15 | 3B | 85 | 58 |
| 3B1 | 250 | 30 | HB-F | 83 | 80 |
| 3B2 | 250 | 15 | F | 85 | 74 |
| 3B3 | 250 | 30 | F-H | 87 | 84 |

In a suitable reactor equipped as described in Example 1 were added 348 parts of ethylene glycol, 1079.2 parts of citric acid and 623.6 parts of n-butanol. Heat was applied raising the temperature to 95° C. over an hour and 15 minute period. At this point, the reactor contents had formed a clear solution. Heating was continued raising the temperature to 124° C., at which point refluxing began. After 1 hour and 13 minutes at 124° C., 20.5 parts of triphenylphosphite were added over 6 minutes. Heating was continued for 10 hours while distilling off water with the temperature rising to 149° C. At this point, the acid value was 98. A nitrogen sparge was then applied followed by vacuum to 13 cm Hg. Heating at 135° C. was continued for about 1 hour. The acid value of the partial ester was 94.

The temperature of the partial ester was adjusted to 100° C. and 0.42 part of aluminum acetyl acetonate and 0.42 part of benzyl triphenyl phosphonium chloride were added. The temperature was raised to 104° C. and slow addition of 205 parts of 1,2-epoxy dodecane was begun. The addition was completed in 5 hours and 15 minutes with the temperature being held at 105°-108° C. About half way through the addition, additional catalyst, 0.42 part aluminum acetylacetonate and 0.42 part benzyl triphenyl phosphonium chloride, was added.

After the addition was completed, heating was continued for hours at 106°-118° C. The acid value of 9.2 and the epoxide equivalent weight was 18,000. The reactor was sparged with nitrogen at 12.5 cm Hg vacuum while heating at 120°-130° C. was continued for 1 hour and 30 minutes. The resulting citric ester had an acid value of 12.1, an epoxide equivalent weight of 24,000, a Gardner-Holdt viscosity at 25° C. of Z-Z , and a solids content of 97.3 percent. The ester was clear with a Gardner color of less than 1.

EXAMPLE 5

To a suitable reactor were added 100.0 parts of ethyl-3-ethoxypropionate and 102.7 parts of the citric ester of Example 4. To a dropping funnel were added 30.0 parts of methyl methacrylate, 60.0 parts of styrene, 105.0 parts of butyl methacrylate, 63.2 parts of hydroxypropyl methacrylate, 32.0 parts of butyl acrylate, 7.5 parts of methacrylic acid, and 11.6 parts of dicumyl peroxide. Heat was applied raising the temperature in the reactor to 162° C. Addition of the monomer and catalyst solution was begun. The addition was completed in 2 hours with the temperature being held at 154°-162° C. The temperature was held for one hour at 154°-160° C. Additional dicumyl peroxide, 1.2 parts, was added and heating at 160° C. was continued for 1 hour and 15 minutes to complete the polymerization reaction. The solvent was then removed by vacuum distillation, 0.8 cm Hg, to a pot temperature of 164° C. n-Butanol, 65.7 parts, was then added.

The resulting copolymer graft had a solids content of 84.7 percent, a Gardner-Holdt viscosity at 25° C. of $Z_6$-$Z_7$ an acid value of 17.3 and a Gardner color of 0-1. When reduced to 80.2 percent solids with butyl acetate, the Gardner Holdt viscosity was $Z_3$-$Z_4$.

To a porcelain pebble mill were added 98 parts of the copolymer graft reduced to 80.2 percent solids, 157.5 parts of titanium dioxide, 12.2 parts n-butanol and 10.1 parts methyl isobutyl ketone. A Hegman fineness grind of 8 was obtained after about 10 hours grind time.

A white paint was prepared by mixing 62.81 parts of pigment grind described above, 14.7 parts of the copolymer graft reduced to 80.2 percent solids, 16.7 parts of a butoxymethoxymethyl melamine at 98 percent solids, 1.5 parts of a catalyst blend of equal parts of an amine neutralized para-toluene sulfonic acid at 25 percent solids in isopropanol and unneutralized para-toluene sulfonic acid at 40 percent solids in isopropanol, 0.8 parts of UV stabilizers, 0.2 part fluorocarbon acid and 8.1 parts of methyl isobutyl ketone.

Films were prepared on Bonderite 1000 steel panels at 3 mil wet film thickness and were baked 15 minutes at 300° F. Paint properties and film properties are shown in Table 2.

EXAMPLE 6

To a suitable reactor were added 84.1 parts of ethyl-3-ethoxypropionate. To a dropping funnel were added 30 parts of methyl methacrylate, 60 parts of styrene, 105 parts of butyl methacrylate, 63.2 parts of hydroxypropyl methacrylate, 32 parts of butyl acrylate, 7.5 parts of methacrylic acid, and 8.7 parts of dicumyl peroxide. Heat was applied raising the solvent temperature to 166° C. Addition of the monomer and catalyst solution was begun and was continued for 2 hours while keeping the temperature at 157°-162° C. The temperature was held at 160° C. for 1 hour. Additional dicumyl peroxide, 0.93 part, was then added and heating at 157°-160° C. was continued for one hour. Vacuum was then applied and the solvent was distilled off to a pot temperature of 154° C. and a vacuum of 1.4 cm Hg. Butyl acetate, 75 parts, was then added.

The resulting copolymer solution had a solids content of 79.15, an acid value of 21.6, a Gardner-Holdt viscosity at 25° C. of $Z_7$-$Z_8$ and a Gardner color of 1-2.

EXAMPLE 7

To a porcelain pebble mill were added 99.3 parts of the copolymer solution of Example 6, 157.5 parts of titanium dioxide, 28.4 parts of n-butanol and 10 parts of methylisobutyl ketone. Grind time to obtain a Hegman grind fineness of 8 was 12 hours.

EXAMPLE 8

A paint was made by mixing together 59.12 parts of the pigment grind of Example 7, 6.7 parts of the citric ester of Example 4, 11.6 parts of the copolymer solution of Example 6, 16.7 parts of a methoxymethyl-s-butoxymethyl melamine at 98 percent solids, 1.5 parts of the catalyst blend of described in Example 5, 0.8 part of UV stabilizers, 0.2 part part of fluorocarbon acid and 8.1 parts of methylisobutyl ketone Films were prepared on Bonderite 1000 steel panels at 3 mil wet film thickness and were baked 15 minutes at 300oF. Paint properties and film properties are shown in Table 2.

EXAMPLE 9

A paint was made by mixing together 66.5 parts of the pigment grind of Example 7, 14.1 parts of the copolymer solution of Example 6, 15.8 parts of the melamine resin described in Example 8, 1.6 parts of the catalyst blend described in Example 7, 0.8 part of UV stabilizers, 0.2 part of fluorocarbon acid, and 10.6 parts of methylisobutyl ketone.

Films were prepared on Bonderite 1000 steel panels at 3 mil wet film thickness and were baked 15 minutes at 300° F. Paint properties and film properties are shown in Table 2.

TABLE 2

Comparison of Paint Properties

| | | | Example | | |
|---|---|---|---|---|---|
| | | | 5 Graft copolymer/ citric ester | 8 Blend Copolymer/ citric ester | 9 Copolymer No citric ester |
| Paint Vehicle | | | | | |
| % N.V. (ASTM 2369) | | | 75.6 | 74.1 | 71.9 |
| Zahn Viscosity | | | 49 | 59 | 48 |
| Film Properties | | | | | |
| Pencil Hardness | | | H | H | 3H |
| MEK Double Rubs | | | 200+ | 200+ | 200+ |
| Direct Impact (ASTM 2794) | | | 52 | 48 | 28 |
| Gloss ∠° | hours | nm | | | |
| 20 | 0 | — | 69 | 72 | 65 |
| 20 | 885 | 340 | 58 | 72 (816 hrs) | 58 |
| 20 | 845 | 315 | 24 | — | 14 |
| 20 | 1054 | 340 | 60 | 71 (1008 hrs) | 56 |
| 20 | 1008 | 315 | 10 | — | 4 |
| 60 | 0 | — | 95 | 93 | 94 |
| 60 | 885 | 340 | 86 | 91 (816 hrs) | 86 |
| 60 | 645 | 315 | 63 | — | 50 |
| 60 | 1054 | 340 | 86 | 87 (1008 hrs) | 86 |
| 60 | 1008 | 315 | 40 | — | 29 |

EXAMPLE 10

Using the procedure described in Example 4, a citric ester was prepared by heating 500 parts of citric acid with 223.9 parts of 1,4-butanediol, 113.5 parts of propylene glycol, 354.9 parts of a mixed alcohol composed mainly of 1-octanol and 1-decanol and 73.6 parts of n-butanol using 18.3 parts of triphenyl phosphite as catalyst and 45 parts of toluene to aid in removal of water of esterification by azeotropic distillation. The resulting product had a Gardner-Holdt viscosity of $Z_5$-$Z_6$, a nonvolatile content of 97.8 percent, an acid value of 13.7 and a color of 1-2.

To a suitable reactor were added 8 parts of tetra bis[methylene (3,5-di-t-butyl-4-hydroxy-hydro cinnimate)] methane, 200 parts of the citric ester described above, 154 parts of ethylene glycol monobutyl ether and 51 parts of 1-propanol. To a dropping funnel were added 181 parts of methyl methacrylate, 182 parts of styrene, 133 parts of hydroxyethyl acrylate, 104 parts of dimethylaminoethyl methacrylate and 40 parts of 2,2'-azobis (2-methylbutane nitrils). Heat was applied raising the temperature to 121° C. Slow addition of the monomer and catalyst solution was begun. The addition was completed in 2 hours with the temperature rising to 135° C. Heating at 118°-135° C. was continued or 1 hour and 35 minutes to complete the polymerization reaction. Additional ethylene glycol monobutyl ether was added to reduce the nonvolatiles to 70 percent. The resulting product had a Gardner-Holdt viscosity at 25° C. of $Z_5$-$Z_6$ at 70.4 percent nonvolatiles, an acid value of 7.0, a Gardner color of 7-8 and a percent total nitrogen of 1.05 percent.

The resulting citric ester grafted copolymer is used as a grinding vehicle for pigment (10 percent carbon black, 5-10 percent lead silicate, 80-85 percent titanium dioxide) at a pigment to binder ratio of 2.0 to 1.0 at a nonvolatile content of 40-60 percent using such solvents as ethylene glycol monohexyl ether, ethylene glycol monobutyl ether, propanol or Dowanol PM. Such grinds when adjusted to a pH of 5.5 to 7.5 are used as pigment feeds for electrodeposition coating baths.

The principles, preferred embodiments and modes of operation of the present invention have been described in the foregoing specification. The invention intended to be protected herein, however, is not to be construed as limited to the particular forms disclosed, since they are to be regarded as illustrative rather than restrictive. Variations and changes may be made by those skilled in the art without departing from the spirit and scope of the invention.

What is claimed is:

1. A process for preparing modified acrylic copolymer compositions which comprises polymerizing acrylic monomers in admixture with a citric ester wherein the citric ester has the formula

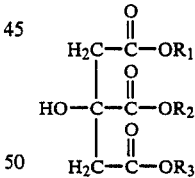

wherein $R_1$ and $R_2$ are selected from:

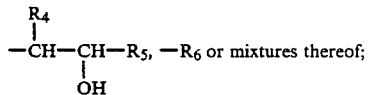

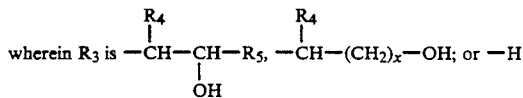

wherein $R_4$ and $R_5$ are H, or an alkyl, cycloalkyl, or alkyl ester group containing 1 to about 32 carbon atoms, wherein the total number of carbon atoms in $R_4$ and $R_5$ are 0 to about 32; wherein $R_6$ is an alkyl group containing 1 to about 18 carbon atoms, or a cyclo alkyl group containing 5 to about 10 carbon atoms; and x has a value of 3 to 18, wherein $R_1$, $R_2$ and $R_3$ are so selected that the total number of OH groups in $R_1$, $R_2$ and $R_3$ are about 1.5 to 3 and the total number of carbon atoms in $R_1$, $R_2$ and $R_3$ are 5 to about 40; and wherein the acid value of the ester is less than about 30, wherein the acrylic monomers and the citric ester are present in the amount of about 15 to about 95 weight percent of acrylic monomers and about 5 to about 85 weight percent of citric ester wherein said weight percents are based on the weight of acrylic monomers and citric ester.

2. The process of claim 1 wherein $R_1$, $R_2$ and $R_3$ are derived from glycols which contain from 2 to 12 carbon atoms and at least one primary hydroxyl group, a vicinal epoxide compound which contains only one epoxide group per molecule, or a primary or secondary alcohol which contains from 1 to 18 carbon atoms.

3. The process of claim 2 wherein the vicinal epoxide compound is an epoxidized alpha olefin which contains from 2 to about 18 carbon atoms.

4. The process of claim 2 wherein the vicinal epoxide compound is an epoxidized ester of an unsaturated acid wherein the acid contains about 18 to about 22 carbon atoms and the ester group is an alkyl group containing 1 to about 8 carbon atoms.

5. The process of claim 1 wherein the R substituents of the citric ester are the following organic radicals in the following equivalent amounts:
   butyl—about 0.5 to about 1.5
   cyclohexyl—0 to about 1
   2-hydroxypropyl—about 0 to about 1.5
   hydroxyethyl—0 to about 0.5
   hydroxy $C_8$–$C_{14}$ alkyl—about 0.1 to about 1 .

6. The process of claim 1 wherein the ester is the reaction product of 1 mole of citric acid, about 0.5 mole of n-butanol, about 0.5 mole of cyclohexanol, about 1 mole of ethylene glycol and about 1 mole of 1,2-epoxy-octane.

7. The process of claim 1 wherein the acrylic copolymer is derived from monomers selected from acrylic ester monomers, aromatic monomers, hydroxyl functional monomers, acid functional monomers, amine functional monomers and mixtures thereof.

8. The process of claim 7 wherein the copolymer has a hydroxyl number of about 30 to about 190 and an acid number of 1 to about 100.

9. The process of claim 7 wherein the acrylic ester monomers are alkyl acrylates or methacrylate wherein the alkyl group contains 1 to about 18 carbon atoms.

10. The process of claim 9 wherein the acrylic ester monomers are butyl acrylate, butyl methacrylate, methyl methacrylate, or mixtures thereof.

11. The process of claim 7 wherein the hydroxyl functional monomers are hydroxyalkyl acrylates or methacrylates.

12. The process of claim 11 wherein the hydroxyl functional monomers are hydroxyethyl acrylate, hydroxyethyl methacrylate, hydroxypropyl acrylate or hydroxypropyl methacrylate.

13. The process of claim 7 wherein the acid functional monomers are acrylic or methacrylic acid.

14. The process of claim 7 wherein the amine functional monomers are dimethylaminoethyl acrylate, dimethylamino propyl methacrylate, or dimethylaminoethyl methacrylate.

15. The process of claim 1 wherein the citric ester is the reaction product of 1 mole of citric acid, about 0.5 mole of n-butanol, about 0.5 mole of cyclohexanol, about 1 mole of ethylene glycol and about 1 mole of 1,2-epoxy-octane and wherein the monomers from which the copolymer is derived are styrene, methylmethacrylate, butylmethacrylate, butylacrylate, hydroxypropylmethacrylate and methacrylic acid wherein the copolymer has a hydroxyl number of about 30 to about 190 and an acid number of 1 to about 100.

* * * * *